July 29, 1958 K. KADELBURG 2,845,476

CASTELLATED CONTACT WASHER

Filed July 18, 1955

INVENTOR.
KURT KADELBURG
BY
D. Gordon Angus
ATTORNEY.

United States Patent Office 2,845,476
Patented July 29, 1958

2,845,476

CASTELLATED CONTACT WASHER

Kurt Kadelburg, West Los Angeles, Calif., assignor to International Rectifier Corporation, El Segundo, Calif., a corporation of California Application July 18, 1955, Serial No. 522,555

4 Claims. (Cl. 174—126)

This invention relates to spring contact washers for dry plate rectifiers.

An object of this invention is to provide a spring contact washer which can simplify the construction of dry plate rectifier stacks, and reduce the number of component parts required therefor.

A related object is to provide a spring contact washer which provides surface contact with a significant area of the counter electrode of a rectifier plate, while at the same time enabling a smaller rectifier plate to be used for a given capacity since less plate area needs to be set aside for spacers and other rectifier elements, and is thus made effective for rectifying current.

In conventional rectifiers, it is a common expedient to eliminate counter electrode material for a considerable radial distance near the center in order that an insulating spacer can press directly on the semi-conducting layer or base plate of a rectifying plate, rather than upon the surface of a counter-electrode region. Pressure on the counter electrode entails the risk of breaking down the rectifying properties of the barrier layer beneath the counter electrode. Eliminating counter electrode material from any part of the plate reduces the area of the rectifying barrier layer, and this requires a larger rectifier for a given capacity. This invention averts the necessity for such a region of no counter electrode material.

This invention is carried out in connection with a conventional dry plate rectifier, which ordinarily comprises a stack of conventional rectifier plates which may be of the selenium type, or which may utilize other well-known rectifying materials. Such rectifying plates commonly have a base plate coated with a layer of a semi-conducting metal such as selenium or the like, and then have a layer of a conductive metal applied atop the rectifying layer for a counter electrode. By an electro-forming process known in the art, a barrier layer is created between the rectifying layer and the counter electrode. In order to provide for current flow between the counter electrode of one plate and the base plate of the neighboring plate it has been conventional practice to insert a spring contact washer therebetween. A central hole is ordinarily provided in the rectifier plate to accommodate a spindle or other means for holding the rectifier plate as a unit.

A feature of this invention resides in providing a spring contact washer which has a central contact area for contacting a first rectifier plate with a hole in said area for passing the spindle, and a plurality of spacer segments rising from the central contact area, each of which has a contact segment adapted to contact a second, neighboring, rectifier plate and legs depending from said contact segments terminating in contact feet for contacting the same rectifier plate as the central contact area.

The above and other features of this invention will be fully understood from the following detailed description and the accompanying drawings, of which:

Figure 1:
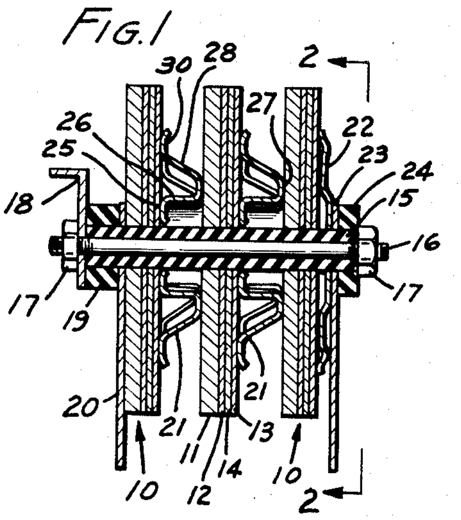
Fig. 1 is a cross-section of a dry plate rectifier incorporating spring contact washers according to the invention.
Figure 2:
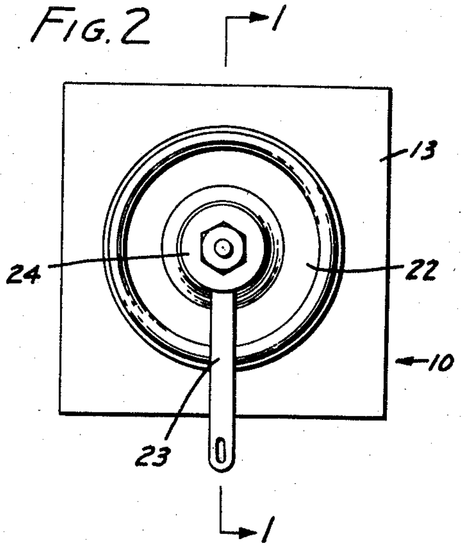
Fig. 2 is a plan view of the rectifier of Fig. 1 taken at line 2—2 of Fig. 1.

A conventional dry plate rectifier is shown in Fig. 1 in which a rectifier stack comprises a plurality of rectifier plates 10. Each rectifier plate has a base plate 11 which may conveniently be iron, aluminum or some other conductive metal, on one side of which is applied a rectifying layer 12 of a semi-conductive material such as selenium, for example. A counter electrode 13 comprises a layer of conductive metal applied by any convenient means onto the rectifying layer 12. As an example of a suitable material for said counter electrode, an alloy comprising 68.5% tin and 31.5% cadmium may be utilized. By an electro-forming process well known in the art, a barrier layer 14 may be created between the rectifying layer 12 and the counter electrode 13. The layers 12, 13 and 14 are shown disproportionally thick in Fig. 1, relative to the base plate, for purposes of illustration.

These rectifier plates 10 are assembled in conductive relationship on a spindle which comprises a central insulating cylinder 15 within which there is fitted a bolt 16 which receives nuts 17 on its ends. An attachment lug 18 may be provided if desired.

The rectifier stack is completed by assembling the following elements on said spindle in the order indicated: an insulating bushing 19, a terminal 20 which bears against the base plate 11 of one of the end rectifier plates, a rectifier plate 10, a spring contact washer 21 according to the invention, another rectifier plate 10, another spring contact washer 21, another rectifying plate 10, and so on through this alternation for as many rectifier plates as may be desired for a given rectifier.

To complete the assembly, a spring contact washer of any convenient design is placed adjacent to and bearing against the end rectifier plate, which bears against a terminal 23. An insulating washer 24 serves to insulate the terminal 23 from the bolt 16 and nuts 17.

Figure 3:
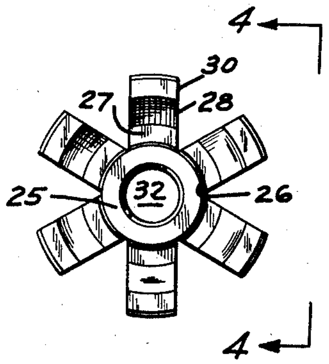
Fig. 3 is a plan view of a spring contact washer according to the invention.

The details of the spring contact washer 21 according to this invention will be more fully appreciated from an examination of Fig. 3. A central contact area 25 is provided for bearing against the central portion of the counter electrode of a first rectifier plate 10, although it will be appreciated that the spring contact washer could, if desired, be reversed so as to bear against the base plate instead of against the counter electrode. Six spacer segments 26 rise substantially perpendicularly from the central contact area and are flexible and separate from each other. Each spacer segment has a contact segment 27 with a substantially flat land for contacting the base plate of a second rectifier plate 10. These contact segments are preferably parallel to the central contact area 25. A leg 28 depends downward from each contact segment to a contact foot 30 which presses against the first rectifier plate along with the central contact area. If desired, to prevent damage to the soft counter electrode during assembly, a turned up portion 31 may be provided on the end of each of the feet 30.

When the contact washers are assembled over the spindle, it will be observed that the central holes 32 in the central contact area makes a snug fit with the insulating cylinder so as to hold the spring contact washers in place against lateral movement. The spacer segments 26 serve to space the rectifier plates a definite distance from each other. The contact areas 25 and feet 30 serve to make conductive contact with the counter electrode. The contact segments 27 makes conductive contact with the base plate of a second rectifier so that a current can flow from the counter electrode of one rectifier plate to the base plate of the next adjacent rectifier plate.

Figure 4:
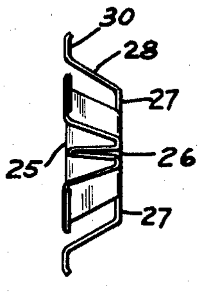
Fig. 4 is a side elevation taken at line 4—4 of Fig. 3.

The contact washer is preferably, although not necessarily, formed so that when it is in the unflexed condition shown in Fig. 4, the feet are axially farther from the contact segments than is the central contact area. Thus, the more flexible legs make the initial contact and flex more easily than the spacer segments, the latter acting more as spacers than as springing contact elements. By this means, it is possible even to do without contact at the central contact area if desired. However, best results will ordinarily be obtained when the rectifier assembly is tightened down so that both the feet 30 and the central contact area 25 make simultaneous contact with the same face of a rectifier plate.

Conventional spring contact washers as used in many dry-plate rectifiers have had numerous disadvantages, one of which was the absence of pressure-limiting components therein. In their absence, it was possible to damage or destroy the rectifying action of the rectifier, since excessive pressure on the counter electrode causes a marked rise in back-voltage. However, merely making the washers weaker and more resilient was no solution to the problem, since the rectifier then did not remain structurally intact. Accordingly, it has been necessary to use an insulating spacer to hold the plates apart and maintain the rectifier as a structural unit. It has not been permissible to let this spacer bear on the counter-electrode, for then the counter-electrode could be crushed and the rectifying action of the plate impaired.

Therefore, the central portion of the counter-electrode has been omitted in many standard rectifiers, so that the washer could bear directly on the semi-conductive layer, which would not impair the action of the rectifier plate. This reduced the area of the barrier layer and proprotionally reduced the capacity of the given rectifier plate.

The washer of this invention incorporates flexible spacer elements which are relatively rigid, so that they can hold the plates apart, since they act as individual columns between the plates. However, being separated from each other, they are inherently more flexible than solid washers, and accordingly yield somewhat in order to minimize forces on the rectifier plates. Therefore it is possible to permit this washer, which also acts as a spacer, to bear directly on the counter-electrode to space the rectifier plates. This increases the useful area of the plates, since the entire surface can be covered with counter-electrode metal, simplifies manufacturing techniques, since no part of the plate needs to be masked when the counter-electrode is applied, and eliminates one element (the insulating spacer) from a standard rectifier stack.

This invention is not to be limited to the embodiment shown in the drawings and described in the description which are given by way of example and not of limitation, but only in accordance with the scope of the appended claims.

I claim:

1. A contact washer for making a conductive contact between two plates of a dry-plate rectifier, said contact washer having a central axis and consisting of a single piece of material, said contact washer including a central flat contact area which is substantially perpendicular to said central axis, a plurality of spacer segments separated from each other and extending from the periphery of said contact area, all of said segments rising substantially perpendicular to and in the same direction from said contact area, said spacer segments thereby being substantially parallel to said central axis, a substantially flat contact segment extending from the end of each of said spacer segments which end is removed from said contact area, said contact segments extending radially outward from said spacer segments and being substantially perpendicular to said central axis, a leg depending from the end of each contact segment which end is removed from the spacer segment, each of which legs slopes away from said central axis and away from said contact segment so as to make an acute angle with said central axis, and a contact foot on the end of each leg, which foot extends radially outward from the end of the leg remote from the contact segment.

2. A contact washer according to claim 1, in which each contact foot is substantially perpendicular to said central axis.

3. A contact washer according to claim 1, in which each contact foot is farther axially spaced from the contact segment than is the contact area.

4. A contact washer according to claim 3 in which the contact area is annular in shape, and in which the said spacer segments are symmetrically disposed around the periphery thereof.

References Cited in the file of this patent

UNITED STATES PATENTS

| | | |
|---|---|---|
| 2,343,379 | Kotterman | Mar. 7, 1944 |
| 2,473,419 | Fletcher et al. | June 14, 1949 |
| 2,586,539 | Harty | Feb. 19, 1952 |
| 2,656,494 | Duval | Oct. 20, 1953 |
| 2,656,495 | Smith | Oct. 20, 1953 |
| 2,712,102 | Bacon | June 28, 1955 |
| 2,725,503 | Wolf et al. | Nov. 29, 1955 |
| 2,780,667 | Cataldo et al. | Feb. 5, 1957 |